United States Patent [19]

Yamazaki et al.

[11] Patent Number: 4,460,269
[45] Date of Patent: Jul. 17, 1984

[54] AUTOMATIC DOCUMENT FEEDER FOR USE IN COMBINATION WITH AN ELECTROPHOTOGRAPHIC COPYING MACHINE

[75] Inventors: Masaru Yamazaki; Kiyoshi Miyashita; Hideyuki Kawazu; Osamu Ishimoto, all of Hachioji, Japan

[73] Assignee: Olympus Optical Company Limited, Tokyo, Japan

[21] Appl. No.: 360,445

[22] Filed: Mar. 22, 1982

[30] Foreign Application Priority Data

Mar. 23, 1981 [JP] Japan ................................ 56-41950
Mar. 23, 1981 [JP] Japan ................................ 56-41951
Mar. 23, 1981 [JP] Japan ................................ 56-41952

[51] Int. Cl.³ ............................................ G03G 15/00
[52] U.S. Cl. .......................... 355/14 SH; 355/3 SH; 271/3.1; 271/4
[58] Field of Search .............. 355/3 SH, 14 SH, 3 R, 355/14 R; 271/3.1, 6, 110, 229, 243, 244, 124, 4

[56] References Cited

U.S. PATENT DOCUMENTS 4,078,787  3/1978  Burlew et al. ............. 355/14 SH X
4,179,215  12/1979  Hage ......................... 355/14 SH X
4,236,808  12/1980  Tusso et al. ................ 355/14 SH X Primary Examiner—A. C. Prescott
Attorney, Agent, or Firm—Fleit, Jacobson, Cohn & Price

[57] ABSTRACT

In an automatic document feeder for use in combination with an electrophotographic copying machine for feeding documents successively into the copying machine by separating and feeding the documents one by one from a stack of documents, the stacked documents are placed on a document table and are fed by a pair of rollers into a nip portion between a rotating separation roller and a separation plate having a rubber sheet applied thereto to separate and feed documents one by one from the lowermost one, and an edge detecting sensor for detecting a front edge of a document is arranged downstream with respect to the separation roller to produce an edge detection signal. When the edge detection signal is produced, the relevant document is once stopped at the front edge detecting sensor and after a start signal for denoting the completion of a copying operation for the preceding document is supplied from the copying machine, the relevant document standing by the front edge detecting sensor is advanced. An opening for manually inserting a document is provided at a downstream position with respect to the front edge detecting sensor and a rotatable lid is provided above the opening.

16 Claims, 7 Drawing Figures

AUTOMATIC DOCUMENT FEEDER FOR USE IN COMBINATION WITH AN ELECTROPHOTOGRAPHIC COPYING MACHINE

BACKGROUND OF THE INVENTION

The present invention relates to an automatic document feeder for automatically feeding stacked documents one by one into a copying machine.

Such an automatic document feeder has been proposed for use in both types of the following electrophotographic copying machines. In a first type copying machine a document is held stationary on a transparent platen and is scanned by a moving optical system, while in a second type copying machine the document is advanced through a fixedly arranged, scanning optical system. In an automatic document feeder to be applied to the first type copying machine, a document is separated from a document stack and is supplied onto the platen. In an automatic document feeder to be used in conjunction with the second type copying machine, a document separated from a document stack is advanced through the optical system by means of a document feeding mechanism provided in the copying machine.

In the case of effecting duplication by the copying machine in combination with a known automatic document feeder, it is necessary to identify or certify that at least one record paper is still in the copying machine before feeding a document. To this end the automatic document feeder is so constructed that a document can be started only after it has been confirmed that there is a record paper within the machine for the relevant document. However, such a solution results in the following limitation in designing the copying machine as well as the automatic document feeder. When use is made of a so-called PPC copying machine in which a single copy is obtained by one rotation of a photosensitive drum, the following condition (1) must be satisfied among a length $l_1$ between a standby point of a document in the automatic document feeder to a document exposing position in the copying machine, a length $l_2$ from the exposing position to a toner image transferring position measured in a rotational direction of the drum along its circumference, and a length $l_3$ from a record paper detecting position of a record paper supply device to the toner image transferring position.

$$l_1 + l_2 < l_3 \quad (1)$$

Therefore, the copying machine is liable to become large in size. In the absence of such a condition, the document should remain in the document feeder until the record paper has been confirmed to be present in the copying machine. Then the speed of copying is made slower.

In the usual copying machine a plurality of copies are formed from a single document by repeatedly scanning the document, while the document remains on the platen. In such a case the feeding of a new document may be initiated in synchronism with the discharge of the preceding document from the platen while the duplication of the preceding document is still being effected. Therefore, when record papers have been used up during the duplication of the preceding document, or paper jamming occurs in the record paper feeding path, it would be rather difficult or complicated to treat the document which has been already fed onto the platen.

There has been proposed a retention type copying machine in which a plurality of copies are formed from the one and same electrostatic latent image once formed on a photosensitive drum by repeatedly effecting development and transferring in succession. In such a copying machine it is sufficient to scan a document only once and thus, after the exposure, the document may be removed from the exposing section of the copying machine. Therefore the next document can be fed onto the platen, while the duplication for the previous document is still effected. Then the above mentioned trouble caused by paper absence or paper jamming becomes much more manifest. Therefore, the known automatic document feeders could not be effectively applied to copying machines of the retention type.

Further, in the known automatic document feeder once it has been set in the copying machines, the documents must always be supplied from the document feeder. Therefore, even when a single document is to be treated, it must be set in the document feeder or the document feeder must be removed from the copying machine. It is apparent that such an operation is quite cumbersome for a user.

SUMMARY OF THE INVENTION

The present invention has for its object to provide a novel and useful automatic document feeder which can be easily combined with copying machines without imposing a serious limitation on the design of the copying machines as well as the document feeder.

It is another object of the invention to provide an automatic document feeder which can be advantageously used in combination with a retention type copying machine in which a plurality of copies can be formed by exposing a document only once.

It is still another object of the invention to provide an automatic document feeder in which a document can be manually supplied to a copying machine without removing the automatic document feeder from the copying machine.

According to the invention, an automatic document feeder for use in combination with a copying machine comprises means for holding a stack of documents to be fed one by one into the copying machine;

means for separating a document successively from the stack of documents placed on said holding means and for feeding the separated document into the copying machine;

means arranged at a downstream position with respect to said separating and feeding means viewed in a document feed direction for detecting a front edge of a document to produce a front edge signal; and means having an input terminal for receiving said front edge signal for controlling said separating and feeding means in such a manner that each separated document is once stopped at a position of said front edge detecting means in response to said front edge signal.

DETAILED DESCRIPTION OF THE PREFERRED EMBODIMENTS

Figure 1:
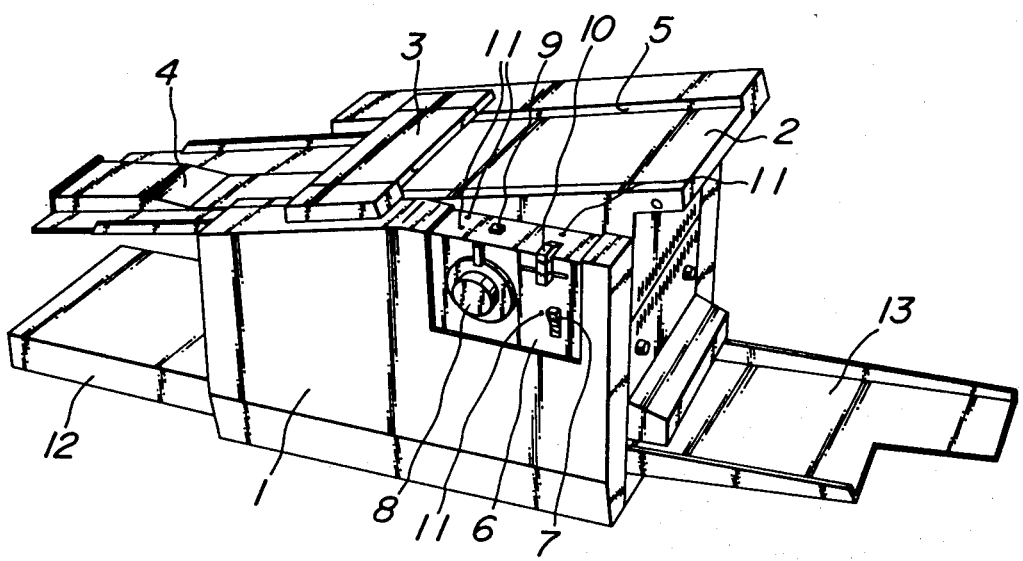
FIG. 1 is a perspective view showing the outer appearance of a known copying machine of the retention type.

FIG. 1 shows the known retention type electrophotographic apparatus disclosed in U.S. Pat. No. 4,260,236 issued on Apr. 7, 1981, to which the automatic document feeder according to the invention is advantageously applied. Referring to FIG. 1, reference numeral 1 designates a main body which is provided along its upper surface with a document feed path composed of a document table 2, light exposure portion 3 and detachable document discharge tray 4 rectilinearly arranged in the order as mentioned above. A sheet document (not shown) is disposed on the document table 2 and slidably moved toward the left as viewed in FIG. 1. The sheet document is held between feed rollers in the light exposure portion 3. The feed rollers cause the document to pass through the light exposure portion 3 at a given speed and discharge it onto the document tray 4. This document feed path is rectilinearly constructed as described above for the purpose of feeding the document without any trouble. In addition, in the present embodiment, the front end of the document feed path viewed in the advancing direction of the document is inclined downwardly for the purpose of effecting insertion and feed of the document in an extremely natural manner. The document table 2 is provided at its one side with an edge guide 5 extending along the advancing direction of the document and determining not only the position of the document to be inserted but also the position of a thick document carriage to be described later and serving also as a guide for the document.

The main body 1 is provided at one side with an operation board 6 including a main power switch 7, dial 8 for determining the number of copies to be formed, stop button 9, light adjusting knob 10 and various kinds of display lamps 11. The dial 8 for determining the number of copies to be duplicated is rotated so as to set a desired number of copies (1 to 20 in the present embodiment) to be obtained when the manuscript is scanned one time by exposed light. The stop button 9 is pushed to stop the copying operation which has been started when the dial 8 was set to any erroneous number of copies. The light adjusting knob 10 is moved rightward or leftward so as to change the brightness of a fluorescent lamp (not shown) incorporated into the light exposure portion 3 and give a correct exposed light corresponding to the darkness of the manuscript. The display lamps 11 function to display the ON state of the main power switch 7, start and end of the copying operation, presence and absence of record sheets in a cassette to be described later, occurrence of jamming or the like. A record sheet supply cassette 12 encloses therein record sheets of a given size. The cassette 12 is detachably mounted on one end surface of the main body 1. If it is desired to obtain copies of a different size, a cassette enclosing record sheets having a desired size is selectively mounted on the main body 1. The main body 1 is provided, at that end surface which is opposed to the end surface on which is mounted the cassette 12, with a copy tray 13 for receiving duplicated copies. One end of the copy tray 13 is rotatably supported by the opposed side surfaces of the main body 1 and the free end of the copy tray 13 is rotated upwardly about its supporting shaft and releasably locked to the main body 1.

In the embodiment shown in FIG. 1, the document feed path may be made horizontal and the document table 2 may be provided at that side edge which is opposed to the edge guide 5 shown in FIG. 1 with another edge guide.

Figure 2:
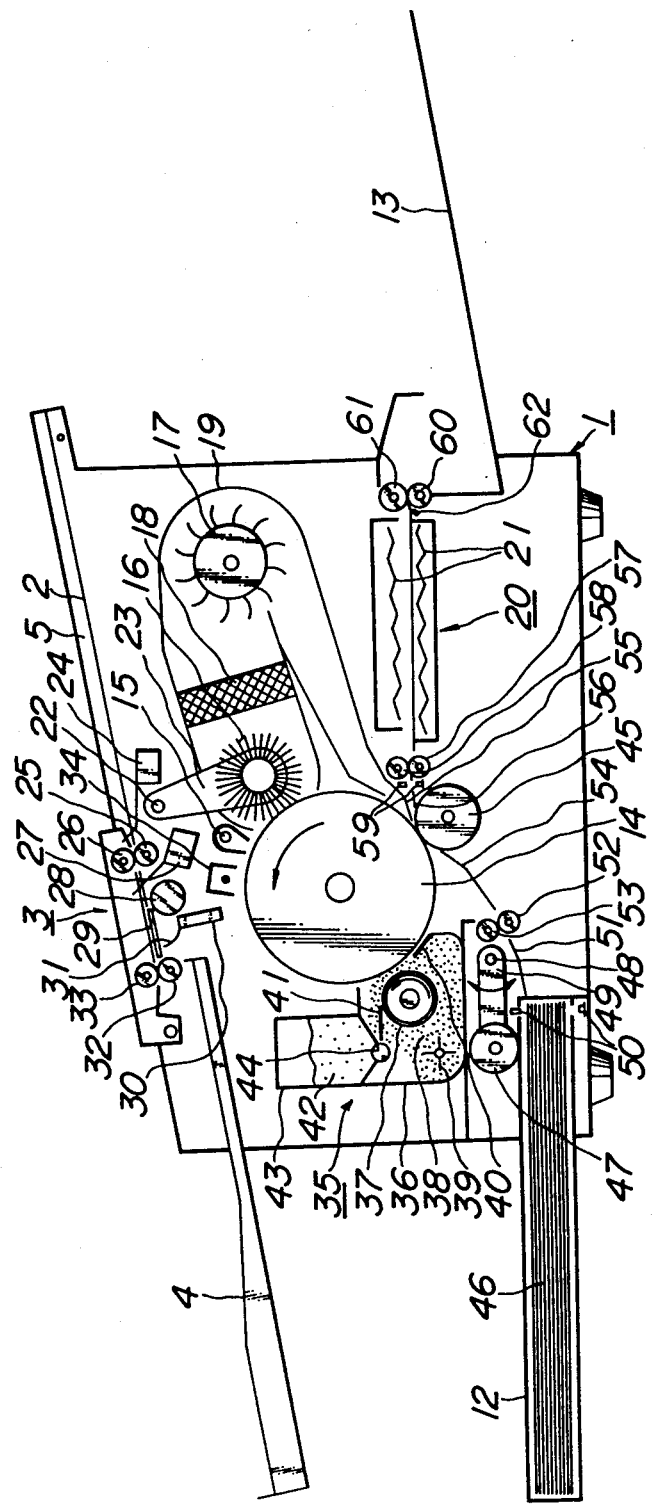
FIG. 2 is a schematic cross sectional view illustrating the inner construction of the copying machine shown in FIG. 1.
Figure 3:
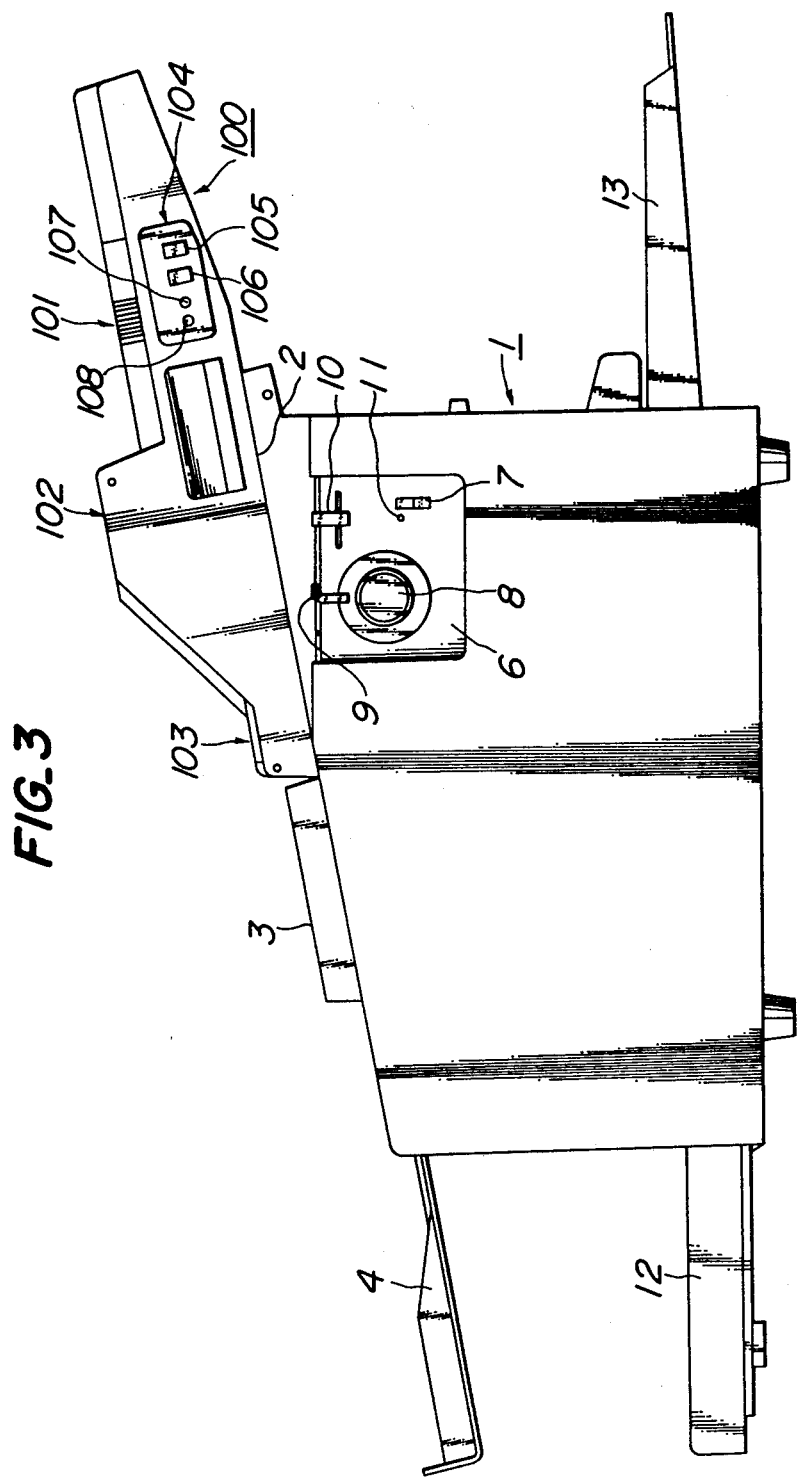
FIG. 3 is a front view showing an embodiment of the automatic document feeder according to the invention and which is arranged on the copying machine shown in FIG. 1.

FIG. 2 shows one embodiment of an interior construction of the electrophotographic apparatus shown in FIG. 1 in section. A seamless photosensitive drum 14 is rotatably journaled in the main body 1 and is rotated in a direction shown by an arrow when the main power switch 7 shown in FIG. 1 is made ON. In the present embodiment, the rotation of the photosensitive drum 14 causes timing pulses to occur which controls various copying steps. At the same time, an erasing lamp 15 provided near the periphery of the photosensitive drum 14, which is turned ON and a cleaning brush 16 is rotated to erase the electrostatic latent image remaining on the photosensitive drum 14 from the previous copying step and to remove remaining toner. The toner removed by the cleaning brush 16 is attracted toward a fan 17 and collected by a filter 18, the fan 17 being rotated by another driving source at the same time as the rotation of the cleaning brush 16. The cleaning brush 16, filter 18 and fan 17 are arranged in a duct 19.

In the present embodiment, the duct 19 is extended up to a toner image transfer portion to be described later, and a flow of air caused by the rotation of the fan 17 is used for the purpose of peeling the record sheet off the photosensitive drum 14 at the transfer portion. As soon as the switch 7 is turned ON, a heater 21 enclosed in an oven type fixing device 20 is energized to raise its temperature.

The cleaning brush 16 is rotatably mounted on an arm 23 which is rotated about a supporting shaft 22 by means of an operating mechanism (not shown) to cause the cleaning brush 16 to be brought into contact with and separated from the photosensitive drum 14.

If the photosensitive drum 14 is rotated by one turn, the toner and electrostatic latent image remaining on the surface thereof are removed and the photosensitive drum 14 is prepared for starting a new copying step. Then the above mentioned operating mechanism causes the cleaning brush 16 to be separated from the photosensitive drum 14 and at the same time the erasing lamp 15 is turned OFF.

During the preparatory operation from the ON position of the main power switch 7 to the end of one rotation of the photosensitive drum 14, a document may be disposed on the document table 2 and slidably moved along the edge guide 5 toward the light exposure portion 3 until the front end thereof functions to operate a first microswitch 24.

The first microswitch 24 functions to rotate through a clutch mechanism (not shown), a document driving roller 25, thereby rotating a driven roller 26 and holding the front end of the document between the rollers 25, 26. As a result, the feed operation of the document is started. If the front end of the document causes a second microswitch 27 to operate, the above mentioned clutch mechanism is released. As a result, the document feed driving roller 25 and driven roller 26 stop rotating to stop the feed of the document held between the rollers 25, 26. This condition is maintained during the preparatory operation from the ON operation of the switch 7 to the end of one turn of the photosensitive drum 14. As soon as this preparatory operation is completed, the above mentioned clutch mechanism becomes driven again to cause the document feed driving roller 25 and driven roller 26 to start their document feed operation again.

The document feed driving roller 25 is connected through the above mentioned clutch mechanism and a driving system (not shown) to the photosensitive drum 14 and rotated at a speed which is in synchronism with the peripheral speed of the photosensitive drum 14 to feed the sheet document.

If the feed operation of the document is started again, a fluorescent lamp 28 incorporated in the main body 1 for illuminating the document is turned ON. As a result, the document passing along a platen glass 29 is exposed to light. A light image of the document scanned by the exposed light is projected through a projection optical system 30 to the photosensitive drum 4. In the present embodiment, the projection optical system 30 is composed of a converging optical fiber array. As a result, the fluorescent lamp 28 may be composed of a slit-shaped fluorescent lamp having a high brightness and generating no high temperature heat and arranged near the document scanning surface of the platen glass 29.

The projection optical system 30 is provided at that side which is opposed to the fluorescent lamp 28 with a concave reflecting mirror 31 for illuminating the scanning surface of the platen glass 29 with a condensed light, thereby ensuring the required brightness and illuminating the scanning surface without casting a shadow thereon.

The sheet document passed over the platen glass 29 and scanned by the exposed light is held between a document discharge driving roller 32, adapted to be normally rotated as soon as the switch 7 shown in FIG. 1 is turned ON, and a driven roller 33 and discharged onto the manuscript discharge tray 4.

During the lapse of time in which the sheet document is stopped at the position of the second microswitch 27 and is fed again and discharged onto the document discharge tray 4, the photosensitive drum 14 which has completed the above mentioned preparatory operation is rotated in a continuous manner, and the surface thereof is uniformly charged with a flow of corona ions directed from a corona discharge device 34 arranged near the periphery thereof and is then illuminated with the light image directed from the projection optical system 30 to produce on the surface thereof an electrostatic latent image corresponding to the document image.

This electrostatic latent image is developed into a visible toned image by means of a developing device 35 arranged near the periphery of the photosensitive drum 14. In the present embodiment, the developing device 35 makes use of a magnet brush developing system using a two component developing agent. The developing device 35 comprises a container 36 in which are arranged a non-magnetic sleeve 37 rotatable in a direction shown by an arrow about a permanent magnet assembly and applying toner particles to the photosensitive drum 14, a mixing blade 39 for mixing the toner particles with a carrier in a developing agent 38, a doctor blade 40 for restricting the length of bar-shaped developing agent 38 formed on the outer surface of the sleeve 37 and a scraper 41 for scraping the developing agent 38 off the sleeve 37. On the container 36 is detachably mounted or made integral therewith a toner supplying container 43 containing toner particles 42 and provided at its lower end with a knurled roller 44. The knurled roller 44 is rotated so as to supply the toner particles 42 to the developing container 36 and hence always maintain any desired concentration of the toner particles in the developing agent 38.

In order to develop the electrostatic latent image on the photosensitive drum 14 without deteriorating it, the carrier of the developing agent 38 may be one having a high resistance, or the sleeve 37 may be provided around its periphery with an insulating layer.

The developing device 35 may eventually be provided with a developing electrode. In this case, a variable, developing bias voltage is applied between the developing electrode and the photosensitive drum 14 so as to control the developing concentration.

The toned image produced on the photosensitive drum 14 by means of the developing device 35 is transferred at a transfer portion to a record sheet by means of a transfer roller 45 urged against the photosensitive drum 14 under a suitable pressure. The transfer roller 45 is formed of an electrically semiconductive resilient material. Between the transfer roller 45 and the photosensitive drum 14 is applied a suitable bias voltage having the same polarity as that of the electrostatic latent image for the purpose of forming an electric field which can transfer the toned image to the record sheet without damaging the electrostatic latent image on the photosensitive drum 14.

As described above, record sheets 46 are enclosed in the cassette 12 and superimposed one upon the other. These record sheets 46 are fed from the cassette 12 one by one by means of a supply roller 47 at a timing which is suitable for transferring the toned image to the record sheet 46 by the transfer roller 45. The sheet supply roller 47 is rotatably mounted on an arm 49 which can rotate about a supporting shaft 48 shown by arrows and urged against the record sheet 46 in the sheet feed cassette 12 at the above mentioned timing so as to feed a sheet. The main body 1 is provided with a record sheet detecting sensor 50 for detecting presence or absence of a record sheet 46 in the cassette 12 mounted on the main body 1. The record sheet 46 supplied from the cassette 12 by means of the sheet supply roller 47 passes along a sheet guide 51 and is held between register rollers 52 and 53 which function to precisely correct the timing and feed speed of the record sheet 46. Then, the record sheet 46 passes along a sheet guide 54 and is fed between the photosensitive drum 14 and the transfer roller 45, thereby transferring the toned image produced on the photosensitive drum 14 to the record sheet 46.

The record sheet with the toned image transferred thereon is peeled off the photosensitive drum 14 by means of a peeling claw 55 and the flow of air sent through the duct 19 from the above mentioned fan 17. The peeled off record sheet passes along a sheet guide 56 and between a pair of feed rollers 57, 58 and through a record sheet feed path and is fed into the fixing device having the heaters 20 arranged above and below the record sheet feed path. In the record sheet feed path between the transfer roller 45 and the feed rollers 57, 58 are arranged record sheet detecting sensors 59, 59 for detecting a jam of the record sheet.

As described above, as soon as the main power switch 7 shown in FIG. 1 is turned ON, the heaters 21 of the fixing devices 20 are energized to raise the temperature during the above mentioned preparatory operation and copying operation to a sufficiently high fixing temperature by the time that the record sheet on which the toned image is transferred reaches the fixing device 20. Subsequently, the fixing temperature is maintained at a suitable value by means of a control device (not shown). The heaters 21 are composed of a resilient, zigzag shaped-wire extending along the record sheet feed path. Such zigzag shaped-wire can absorb its thermal expansion by its resilient bent portion and hence is prevented from being hung down.

After the fixing operation, the record sheet is discharged onto the copy discharge tray 13 by means of a pair of discharge rollers 60, 61. In the record sheet feed path between the fixing device 20 and the discharge rollers 60, 61 is arranged a record sheet detecting sensor 62 for detecting a jam of the record sheet.

As soon as the switch 7 is turned ON, either one or both pairs of feed rollers 57, 58 and discharge rollers 60, 61 are normally rotated.

After the transfer step, the photosensitive drum 14 is further rotated to repeat the developing and transfer steps only, and as a result, a desired number of copies, in the present embodiment at most 20 copies, may be obtained on the basis of the same electrostatic latent image once produced on the photosensitive drum 14. In the case of obtaining a plurality of copies from one document, the cleaning brush 16 is separated from the photosensitive drum 14 and the erasing lamp 15, document illumination fluorescent lamp 28 and corona discharge device 34 are in inoperative condition. In the present embodiment, the document illumination fluorescent lamp 28 is turned ON during a period from the starting of the feed of the document to the end of one rotation of the photosensitive drum 14. Immediately after the last transfer step of the final copy among the desired number of copies, the cleaning brush 16 is brought into contact with the photosensitive drum 14 and the erasing lamp 15 is turned ON. As a result, the toner particles and electrostatic latent image remaining on the photosensitive drum 14 are erased so as to ready the photosensitive drum 14 for the next copying step. In this case, if the next document is not inserted into the light exposure portion 3, the photosensitive drum 14 is rotated for a given number of turns after the final transfer step and then is stopped and at the same time the rotation of the fan 17 is also stopped.

During the above mentioned step of obtaining a plurality of copies, if the next document is inserted into the light exposure portion 3, this document functions in the same manner as in the case of the preparatory operation. This is, the front end of the document causes the first microswitch 24 to operate and is held between the document feed driving and driven rollers 25 and 26 and then causes the second microswitch 27 to operate. Then, the document stands ready for completion of the step of obtaining a plurality of copies for the preceding document. The final transfer step of obtaining the plurality of copies for the preceding document is started and the toner particles and the electrostatic latent image remaining on that part of the photosensitive drum 14 at which the transfer step has been effected are erased by the cleaning brush 16 and erasing lamp 15.

If this cleaned portion arrives at the corona discharge device 34, it becomes operative to uniformly charge the photosensitive drum 14. Meanwhile, the next document standing ready for its feed operation is fed by the driving and driven rollers 25 and 26 such that the next document passes over the platen glass 29 in synchronism with that movement of the uniformly charged portion of the photosensitive drum 14 which arrives at the position of the projection optical system 30. As a result, the next document is scanned by the exposed light in the same manner as described above. Thus, it is possible to obtain copies for a plurality of documents without interruption. After the rear end of the document arrives at the light exposure portion 3, the operator can insert the next manuscript with a sufficiently long time interval.

FIGS. 3 to 6 show an embodiment of the automatic document feeder according to the invention. An automatic document feeder 100 of the present embodiment is set on the electrophotographic copying machine shown in FIGS. 1 and 2 and comprises a document inserting section 101 at which a stack of documents to be duplicated is placed on the feeder, a document separating section 102 for separating stacked documents one by one and supplying separated documents successively into the exposing section 3 of the copying machine, and a manual inserting section 103 for manually inserting documents one by one. The automatic document feeder 100 further comprises an operation panel 104 on which are arranged a start switch 5 for initiating an automatic document feed, a stop switch 106 for forcibly stopping the automatic document feed, an operation display lamp 107 for indicating a ready condition for the automatic feed and the automatic document feed condition, and a jam display lamp 108 for denoting an occurrence of document jamming in the automatic document feeder. The operation display lamp 107 emits a green light when the feeder is in the ready condition for the automatic feed and emits a red light when a separated document is detected at a given position in the document separating section 102.

Now the construction of the various sections of the automatic document feeder 100 will be explained in more detail.

The document inserting section 101 comprises a document table 110 on which a stack of documents is placed, and a document guide 111. The document table 110 is inclined at substantially the same angle as the document table 2 of the copying machine. The document guide 111 extends in the document feed direction and is movable in a direction perpendicular to the document feed direction so as to allow the insertion of documents of different sizes.

The document separating section 102 comprises a document start sensor 115 consisting of a photo-coupler for detecting the insertion of the documents onto the inserting section 110. The documents placed on the document table 110 are fed forward by means of a document feed driving roller 116 and a driven roller 117. The driven roller 117 is rotatably secured to a free end of an arm 118 swingably journaled about a shaft 119 which is supported by a frame 120. The driven roller 117 is urged against the driving roller 116 due to gravitational force, while the roller 117 can move with respect to the roller 116 in dependence upon the thickness of the document stack. The stack of documents is fed forward by the rollers 116 and 117 along a guide plate 121 into a position of a separation roller 122. The separation roller 122 is made of resilient material, such as foamed rubber, and is rotatably supported by the frame 120. Against the separation roller 122 is arranged a separation plate 123 having a rubber sheet 124 applied thereto on a surface facing the roller 122. The rubber sheet 124 serves to retain the documents except for the lowermost one.

Figure 5:
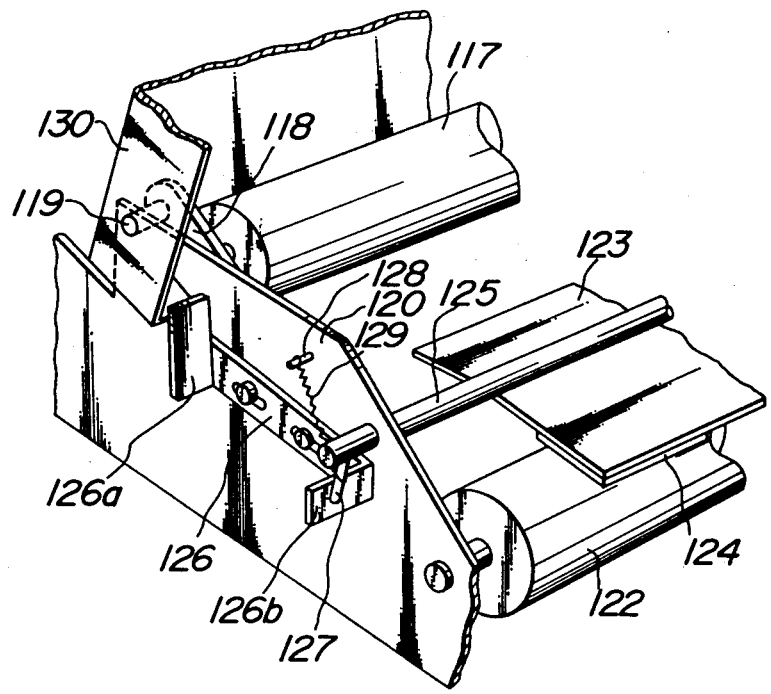
FIG. 5 is a perspective view illustrating the document separating section of the automatic document feeder shown in FIG. 3.

As shown best in FIG. 5, the separation plate 123 is secured to a shaft 125 which is rotatably secured to the frame 120. At one end of the shaft 125 is secured a pin 127, and a coiled spring 129 is arranged between the pin 127 and a pin 128 which is fixed to the frame 120 so as to bias the shaft 125 to be rotated in the clockwise direction in FIG. 5. In this manner the separation plate 123 is resiliently urged against the separation roller 122 to separate the lowermost document out of the stack of documents successively. The document thus separated is fed between guides 132 and 133 and is discharged out of the separating section 102. In this manner the documents can be successively fed into the exposing section 3 by way of the document table 2 of the copying machine. The guide 133 is formed by a conductive brush to remove undesired electrostatic charge which might be produced on the documents by the frictional engagement with the separation roller 122. A front edge sensor 134 consisting of a photo-interrupter is arranged in the document feed path at a downstream position viewed in the document feed direction with respect to the separation roller 122.

Figure 4:
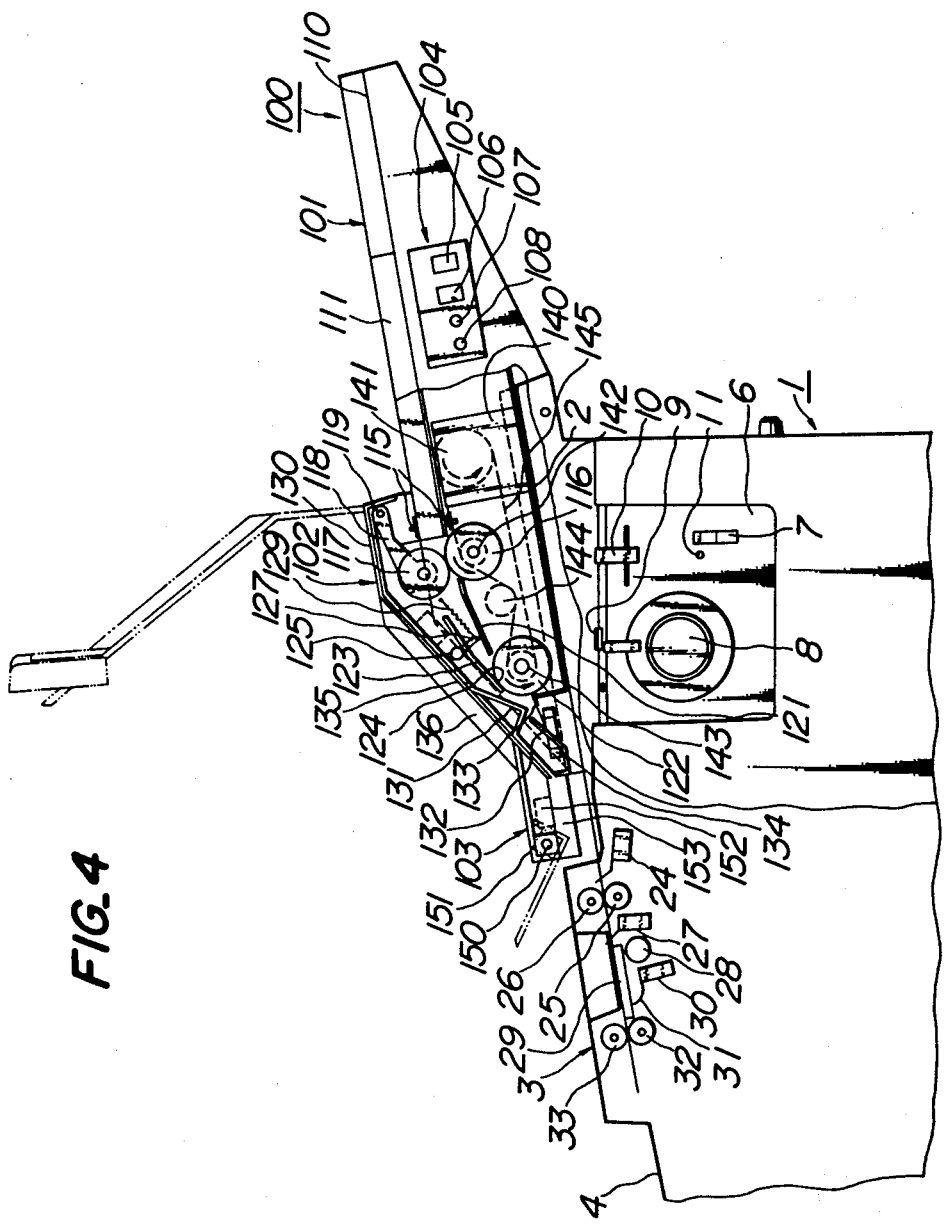
FIG. 4 is a partial cross section depicting the inner construction of the automatic document feeder shown in FIG. 3.

The automatic document feeder 100 further comprises a cover 130 which is rotatably supported by the frame 120 about the shaft 119. In FIG. 4 the cover 130 in its opened position is shown in dashed lines. As illustrated in FIG. 5, on the frame 120 is movably secured a lever 126 having one end projection 126a and the other end projection 126b, these projections 126a and 126b being engaged with the cover 130 and the pin 127 on the shaft 125, respectively. When the cover 130 is turned to open, the slide lever 126 is moved against the force of the spring 129 to rotate the shaft 125 in the counter-clockwise direction, and thus the separation plate 123 is moved away from the separation roller 122. A microswitch (not shown) is arranged to be actuated by the turning cover 130 and when the microswitch detects the opening of the cover 130, the main power supply is turned OFF. The outer surfaces of the cover 130 are formed as a document guide surface 135 and an edge guide 136 and at a front end of the cover 130 is formed an opening through which a document can be manually fed. The driving roller 116 and the separation roller 122 are driven by a motor 140 provided in the automatic document feeder 100. For this purpose a sprocket wheel 141 is connected via a clutch (not shown) to an output shaft of the motor 140 and sprocket wheels 142 and 143 are also secured to the driving roller 116 and separation roller 122, respectively. An endless chain 145 is provided around these sprocket wheels via a tension wheel 144.

The manual inserting section 103 is provided at a downstream position with respect to the edge sensor 135 of the document separating section 102, and comprises a lid 151 arranged above the opening formed in the cover 130, rotatable about a shaft 150, and a mode selection switch 152 consisting of a microswitch actuated by the rotatable lid 151. The shaft 150 is journaled by a frame 153 which is integrally formed with the cover 130 of the document separating section 102. The lid 151 in its open state is illustrated by dashed lines in FIG. 4. The mode selection switch 152 allows automatic document feed when the lid 151 is closed, but inhibits automatic document feed when the lid 151 is opened, so as to allow the manual insertion of a document. The document manually inserted into the automatic document feeder 100 through the opening formed by turning the lid 151 is manually fed along the document guide surface 135 into the exposing section 3 of the copying machine.

Figure 6:
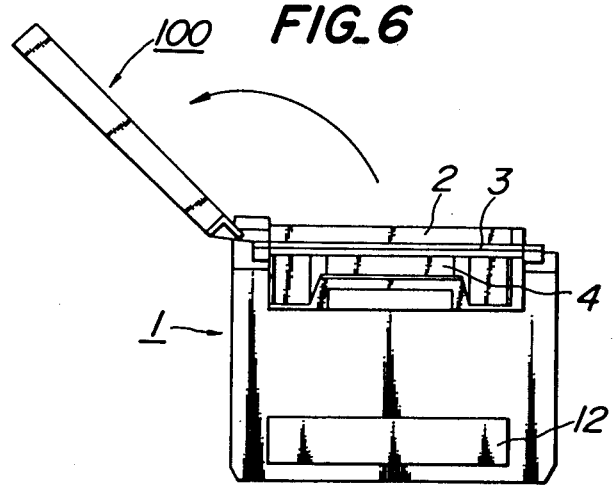
FIG. 6 is a side view showing the automatic document feeder in its retired position.

The automatic document feeder 100 is electrically connected to the copying machine by means of a power supply cord and various signal conductors. When the main power switch 7 of the copying machine is turned ON, the operation display lamp 107 of the automatic document feeder 100 emits a green light when the cover 130 and lid 151 are closed. As shown in FIG. 6, the automatic document feeder 100 is hinged to the main body 1 of the copying machine along its rear edge and when the automatic document feeder 100 is not used, the feeder 100 may be turned in a direction shown by an arrow and the document table 2 of the copying machine is exposed. Then the copying machine can be utilized in a normal manner.

Figure 7:
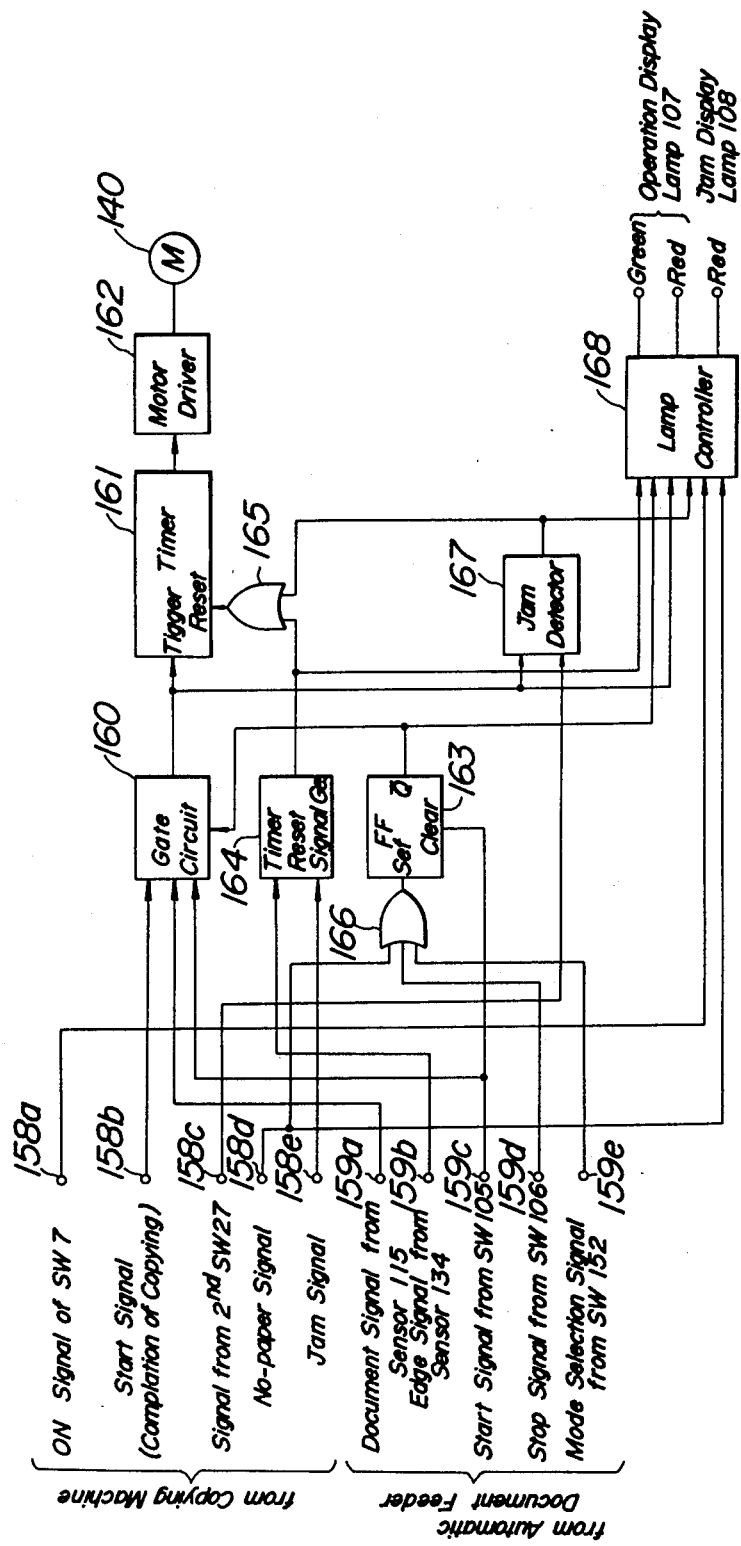
FIG. 7 is a block diagram illustrating an embodiment of a control circuit of the automatic document feeder according to the invention.

FIG. 7 is a block diagram showing an embodiment of a control circuit of the automatic document feeder. The control circuit receives from the copying machine at its inputs 158a to 158e an ON signal from the main power switch 7, a start signal representing a completion of duplication for a preceding document, a signal from the second switch 27, a no-paper signal from the sensor 50 and a paper jam signal, respectively. It should be noted that the no-paper signal might be produced after a document has been fed into the exposing section 3. The control circuit further receives at its inputs 159a to 159e from the automatic document feeder 100 a document detection signal from the document start sensor 115, a document front edge detection signal from the edge sensor 134, a start signal from the start switch 105, a stop signal from the stop switch 106 and a mode signal from the mode selection switch 152, respectively. The start signal from the copying machine, the document detection signal from the document start sensor 115 and the start signal from the start switch 105 of the automatic document feeder 100 are supplied to a timer trigger signal gate circuit 160 which allows a passage of a trigger pulse for triggering a motor controlling timer 161. Then the motor 140 is energized by means of a motor driving circuit 162 for a given time period determined by an operating duration of the timer 161, and thus, the driving roller 116 and separation roller 122 are rotated by means of the clutch, the sprocket wheel 141 and the chain 145. The timer trigger signal gate circuit 160 is controlled by an output signal from a flip-flop 163 in such a manner that the gate circuit 160 is closed to inhibit the passage of the timer trigger signal therethrough when the flip-flop 163 is set. The motor 140 is deenergized at an expired time signal from of the motor control timer 161 or at an instant when the timer 161 receives a reset signal. The paper jamming detection signal and document front edge detection signal are supplied to a timer reset signal generating circuit 164 to produce a timer reset signal which is then supplied through an OR circuit 165 to a reset terminal of the motor control timer 161. The flip-flop 163 is set by any one of the no-paper signal from the copying machine, the stop signal from the stop switch 160 and the manual feed signal from the mode selection switch 152, these signals being supplied via an OR circuit 166. The flip-flop 163 is reset by the start signal from the start switch 105. The operation signal from the second switch 27 provided in the exposing section 3 of the copying machine and the output signal from the timer trigger signal gate circuit 160 are supplied to a jam detection circuit 167. When a jam signal is produced from the circuit 167, the motor control timer 161 is reset via the OR circuit 165. The ON signal of the main power switch 7 of the copying machine, the no-paper signal and output signals from the timer trigger signal gate circuit 160, the timer reset signal generating circuit 164, the flip-flop 163 and the jam detecting circuit 167 are supplied to a lamp control circuit 168 to control the display lamps 107 and 108 provided on the operation panel 104 of the automatic document feeder 100.

Now the operation of the control circuit will be explained.

(1) Normal Copying Operation with Automatic Document Feed

When the automatic document feeder 100 is in the standby condition, the operation display lamp 107 emits a green light. Now a stack of documents is placed on the document table 110 and is inserted into the document separating section 102 and then the document stack is detected by the document start sensor 115 and the lamp 107 emits a red light. At the same time the motor control timer 161 is triggered via the timer trigger signal gate circuit 160. Then the driving roller 116 and separation roller 122 are rotated in the given direction and the stacked documents are fed forward into a nip between the separation roller 122 and separation plate 123. As described above, since the driven roller 117 is urged against the driving roller 116 due to the gravitational force and is moved in accordance with the thickness of the document stack, it is possible to positively feed a document stack having any thickness. When the stacked documents arrive at the nip between the separation roller 122 and the separation plate 123, the stacked documents are shifted mutually in such a manner that a lower document is fed slightly forward of an upper document and the lowermost document is separated from the document stack with the aid of the separation roller 122 and the rubber sheet 124. It should be noted that since the guide 121 is bent downward viewed in the feed direction, the stacked documents are also bent accordingly and the separating action can be improved. The separated document is further fed along the guides 131, 132 and 133, and when its front edge is detected by the edge sensor 134, the reset signal is supplied from the timer reset signal generating circuit 164 to the motor control timer 161 by means of the OR circuit 165 and the motor 140 is deenergized. Therefore, the feed of the separated lowermost document is once stopped. At the same time, the display lamp 107 emits a green light to indicate that the standby condition has been completed. Under such a condition when the start switch 105 is actuated, the motor control timer 161 is triggered again via the gate circuit 160 to start the automatic document feed. During this operation, the lamp 107 emits red light. In this manner the first document is automatically fed into the exposing section 3 of the copying machine and the duplicating operation is carried out for this document.

After the rear edge of separated document has passed through the separation roller 122, a next lowermost document is separated and fed forward. When the front edge of this document is detected by the edge sensor 135, the document is once stopped until a start signal representing a completion of the duplicating operation for the preceding document is supplied from the copying machine. This start signal may be produced in the copying machine when the content of a copy number counter installed in the copying machine becomes zero. When the start signal is supplied from the copying machine, the motor control timer 161 is triggered via the gate circuit 160 to initiate the document feed. In this manner, the documents are successively fed one by one into the copying machine. Since the motor 140 is automatically deenergized at the time up instant of the timer 161, the motor 140 is automatically stopped after the last document has been fed. The above operation is also applied to a case in which a plurality of copies are formed for respective documents.

In the normal document feed explained above, the stacked documents can be automatically fed one by one in synchronism with one rotation of the photosensitive drum in case of the single copy mode or in synchronism with the start signal which is produced when the duplicating operation for the preceding document has been completed in case of the multiple copy mode. In any copy mode, the documents can be automatically fed successively in synchronism with the copying operation of the copying machine and thus, the desired number of duplicated copies can be formed efficiently.

In the present embodiment, since the clutch is provided between the output shaft of the motor 140 and the sprocket wheel 141, an excess rotation, i.e., overshoot due to inertia of the driving roller 116 and separation roller 122 at ON and OFF instants of the motor 140, can be effectively avoided, and thus the document can be fed precisely into the given position.

(2) Jamming in the Automatic Document Feeder

When the automatic document feed is hindered due to any cause, a jam detection signal is produced from the jam detection circuit 167 and the motor control timer 161 is reset by this jam detection signal via the OR circuit 165 to deenergize the motor 140 and the clutch. At the same time the operation display lamp 107 is extinguished and the jam display lamp 108 is actuated to emit a red light. The detection of jamming in the circuit 167 may be effected in the following manner. Now it is assumed that the length from the edge sensor 134 to the second switch 27 in the exposing section 3 is l and the document feeding speed is v. Then the jamming can be detected when the time T required for the document to be fed from edge sensor 134 to the second switch 27 becomes longer than a given time $T_o = l/v$. A jammed document must be removed from the automatic document feeder 100 by opening the cover 130. When the cover 130 is opened, the separation plate 123 is moved away from the separation roller 122 in conjunction with the rotation of the cover 130. Therefore, the jammed document can be easily removed without damage. Further when the cover 130 is opened, a microswitch (not shown) is actuated to shut down the power supply to the document feeder 100. After removing the jammed document and closing the cover 130, when the start switch 105 is actuated, the remaining documents are automatically fed one by one and the normal copying operation proceeds.

(3) Jamming in the Copying Machine

When a record paper is jammed in the copying machine and the jam signal is supplied from the copying machine, the motor control timer 161 is reset via the timer reset signal generating circuit 164 and OR circuit 165 to stop the motor 140 immediately. In the copying machine shown in FIGS. 1 and 2, the document which is just positioned under the exposing section 3 at an occurrence of jamming will be automatically discharged onto the document tray 4 without being duplicated. However, this document may be manually fed into the copying machine by opening the lid 151 and one or more copies may be formed for this document. Then the start switch 105 is actuated to feed the remaining documents in the document feeder 100. In this manner the copying operation can be continued without causing any disorder of the documents.

(4) No-paper in the Copying Machine

When it is detected in the copying machine that there is no record sheet in the cassette 12, the no-paper signal is generated. During automatic document feed when this no-paper signal is supplied to the document feeder 100, the flip-flop 163 is set via the OR circuit 166. Then the generation of the trigger signal from the timer trigger signal gate circuit 160 is inhibited and the further feed of the document standing by the edge sensor 134 is prevented. At the same time the operation display lamp 107 is extinguished. When the cassette 12 is removed from the copying machine and is set again after supplementing record papers, the no-paper signal disappears and the lamp 107 starts to emit a green light to indicate the ready state.

Since the given number of copies have not been formed for the related document, this document is manually fed into the copying machine to print the required number of copies. Then the start switch 105 is actuated to reset the flip-flop 163 and thus, the motor control timer 161 is triggered again to feed the remaining documents one by one. In this manner it is possible to obtain the desired number of copies for respective documents in a correct order.

(5) Stop Operation

When the stop switch 106 is actuated, the flip-flop 163 is set by means of the OR circuit to inhibit the feed of a document which is situated at the front edge sensor 134. However, when the document has already been fed beyond the edge sensor 134 at the time of actuation of the stop switch 106, the duplicating operation for this document will be effected normally and the feeding of the next document will be prevented. Further the duplicating operation of multiple copies will be continued without interruption.

(6) Manual Document Feed

As explained above, when the jam signal and no-paper signal are generated in the copying machine, the given desired number of copies might not be formed for the relevant document. Then the document which has been discharged on the document tray 4 is manually inserted into the manual inserting section 103 by opening the lid 151. When the lid 151 is opened, the mode selection switch 152 is actuated to set the flip-flop 163 via the OR circuit 166 and the automatic document feed is inhibited. That is to say, when the lid 151 is opened, the automatic feed mode is automatically changed into the manual feed mode. Then the relevant document is manually fed along the document guide surface 135 on the cover 130 into the exposing section 3 of the copying machine to effect the copying operation. It should be noted that it is preferable prior to the manual feed to reset the copy dial 8 to a number which is equal to the given number minus the number of copies which have been already formed for the relevant document. After the duplication of the copies, the lid 151 is closed and the copy dial 8 is set again to the initial given number and then the start switch 105 is actuated. Now the remaining documents in the feeder 100 are automatically fed one by one in a usual manner. In this manner, a given number of copies can be formed for respective documents in the correct order and thus a collator or sorter may be advantageously combined. It should be noted that the manual feed mode can be set when one or more extra documents are to be duplicated, while interrupting the automatic document feed from the feeder 100. Since the manual document feed could never be effected unless the lid 151 is opened, a manually inserted document is never fed together with an automatically fed document.

What is claimed is:

1. An automatic document feeder for use in a copying machine comprising:
    means for holding a stack of documents to be fed one by one into the copying machine;
    means for separating a document successively from the stack of documents placed on said holding means and for feeding the separated document into an exposing position of the copying machine;
    means arranged at a downstream position between said separating and feeding means and the exposing position viewed in a document feed direction for detecting a front edge of a document to produce a front edge signal; and
    means having an input terminal for receiving said front edge signal for controlling said separating and feeding means in such a manner that each separated document is once stopped at said position of said front edge detecting means in response to said front edge signal.

2. An automatic document feeder according to claim 1, wherein said controlling means comprises a second input terminal for receiving from the copying machine a start signal for denoting an allowance of a document feed, and the document which has been stopped at said front edge detecting means is started to advance in response to said start signal.

3. An automatic document feeder according to claim 2, wherein said start signal is a copy completion signal which is produced in the copying machine when a copying operation for a preceding document has been finished.

4. An automatic document feeder according to claim 3, wherein said controlling means further comprises a third input terminal for receiving from the copying machine an inhibition signal for denoting that a record paper cannot be transported in the copying machine, and when the inhibition signal is received, a document which has been started to advance from said front edge detecting means is fed as it is and a next separated document is stopped at the front edge detecting means.

5. An automatic document feeder according to claim 4, wherein said inhibition signal is a no-paper signal produced in the copying machine when no record paper is detected in the copying machine.

6. An automatic document feeder according to claim 4, wherein said controlling means further comprises a fourth input terminal for receiving a stop signal from the copying machine and when said stop signal is received, the document feed is stopped immediately.

7. An automatic document feeder according to claim 6, wherein said stop signal is a jam signal which is produced in the copying machine when a record paper jamming is detected.

8. An automatic document feeder according to claim 6, wherein said controlling means comprises a reset signal generating circuit connected to said first input terminal to generate a reset signal in response to said front edge signal and a timer having a trigger input connected to said second input terminal and a reset input connected to an output of said reset signal generating circuit, whereby said timer is triggered by said start signal to produce a driving signal for driving said separating and feeding means for a given time period unless the reset signal is supplied to the reset input.

9. An automatic document feeder according to claim 8, wherein said controlling means further comprises a gate circuit connected between said second input terminal and said timer and having a control input coupled with said third input terminal, whereby said gate circuit is closed when the inhibition signal is received at the third input terminal.

10. An automatic document feeder according to claim 9, wherein said controlling means comprises a flip-flop which is set by the inhibition signal received at the third input terminal and which has an output connected to the control input of the gate circuit.

11. An automatic document feeder according to claim 10, wherein said controlling means further comprises a fifth input terminal connected to a clear input of said flip-flop and receiving a document feed start signal, whereby the flip-flop is reset by said document feed start signal.

12. An automatic document feeder according to claim 8, wherein said controlling means further comprises a circuit for detecting jamming of a document in the automatic document feeder to produce a document jam signal and having an output connected to the reset input of said timer.

13. An automatic document feeder according to any one of the preceding claims 1 to 12, further comprising means for allowing a manual insertion of a document and provided at a downstream position with respect to the front edge detecting means viewed in the document feed direction.

14. An automatic document feeder according to claim 13, wherein said manual insertion allowing means comprises an opening, a movable lid movably arranged above the opening and a document guide surface, whereby the document is manually fed into the copying machine by means of the document guide surface and the opening, while the lid is moved away from the opening.

15. An automatic document feeder according to claim 14, wherein said document guide surface is formed by an outer surface of a cover rotatably positioned above the separating and feeding means and the detecting means.

16. An automatic document feeder according to claim 14, wherein said controlling means further comprises a switch which is actuated by the lid, whereby as long as said lid is moved away from said opening, the separated document remains at said detecting means to inhibit the automatic document feed.

* * * * *